US006333444B1

(12) United States Patent
Ellis et al.

(10) Patent No.: US 6,333,444 B1
(45) Date of Patent: Dec. 25, 2001

(54) OXIDATION CATALYST AND PROCESS UTILIZING THE CATALYST

(75) Inventors: Brian Ellis, Lower Sunbury; Michael David Jones, Beverley, both of (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/506,092

(22) Filed: Feb. 17, 2000

(30) Foreign Application Priority Data

Apr. 1, 1999 (GB) .................................................. 9907704

(51) Int. Cl.$^7$ ........................... C07C 5/333; C07C 67/00; C07C 51/16; B01J 23/54
(52) U.S. Cl. ........................ 585/658; 562/544; 562/548; 560/241.1; 560/243; 502/305; 502/311; 502/312; 502/317; 502/344
(58) Field of Search ..................................... 502/305, 311, 502/312, 317, 344; 585/658; 560/241.1, 243; 562/544, 548

(56) References Cited

U.S. PATENT DOCUMENTS

| | | | |
|---|---|---|---|
| 4,250,346 | 2/1981 | Young et al. ........................ | 585/658 |
| 4,339,355 | * 7/1982 | Decker et al. ........................ | 502/343 |
| 4,410,752 | * 10/1983 | Blum et al. ........................ | 585/658 |
| 4,524,236 | * 6/1985 | McCain ................................. | 585/658 |
| 4,568,790 | * 2/1986 | McCain ................................. | 585/658 |
| 5,364,825 | * 11/1994 | Neumann et al. .................... | 502/311 |
| 6,030,920 | * 2/2000 | Karim et al. ........................ | 502/312 |
| 6,040,474 | * 3/2000 | Jobson et al. ........................ | 560/243 |
| 6,194,610 | * 2/2001 | Borchert et al. ..................... | 562/548 |

FOREIGN PATENT DOCUMENTS

| | | | |
|---|---|---|---|
| 196 30 832 A1 | 2/1998 | (DE) . | |
| 197 17 076 A1 | 10/1998 | (DE) . | |
| 2297043-A | * 7/1996 | (GB) . | |
| WO-98/05620-A1 | * 2/1998 | (WO) . | |
| 98/47850 | 10/1998 | (WO) . | |
| 98/47851 | 10/1998 | (WO) . | |
| 99/20592 | 4/1999 | (WO) . | |
| 99/51339 | 10/1999 | (WO) . | |

* cited by examiner

Primary Examiner—Walter D. Griffin
(74) Attorney, Agent, or Firm—Nixon & Vanderhye

(57) ABSTRACT

A catalyst composition and its use for the oxidation of ethane to ethylene and/or acetic acid and/or for the oxidation of ethylene to acetic acid which comprises in combination with oxygen the elements molybdenum, vanadium, niobium and gold in the absence of palladium according to the empirical formula: $MO_a W_b Au_c V_d Nb_e Y_f$ (I) wherein Y is one or more elements selected from the group consisting of: Cr, Mn, Ta, Ti, B, Al, Ga, In, Pt, Zn, Cd, Bi, Ce, Co, Rh, Ir, Cu, Ag, Fe, Ru, Os, K, Rb, Cs, Mg, Ca, Sr, Ba, Zr, Hf, Ni, P, Pb, Sb, Si, Sn, Tl, U, Re, Te, La and Pd; a, b, c, d, e and f represent the gram atom ratios of the elements such that: $0<a\leq1$; $0\leq b<1$ and $a+b=1$; $10^{-5}<c\leq0.02$; $0<d<2$; $0<e\leq1$; and $0\leq f\leq2$.

13 Claims, No Drawings

OXIDATION CATALYST AND PROCESS UTILIZING THE CATALYST

The present invention relates to a catalyst for the oxidation of ethane to ethylene and/or acetic acid and/or for the oxidation of ethylene to acetic acid, and to a process for the production of acetic acid and/or ethylene utilising the aforesaid catalyst. Catalysts comprising molybdenum, vanadium and niobium in combination with oxygen for use in processes for the production of acetic acid by the oxidation of ethane and ethylene are known in the art from, for example, U.S. Pat. No. 4,250,346.

U.S. Pat. No. 4,250,346 discloses the oxidative dehydrogenation of ethane to ethylene in a gas phase reaction at relatively high levels of conversion, selectivity and productivity at a temperature less than 500° C. using as catalyst a composition comprising the elements molybdenum, X and Y in the ratio $Mo_aX_bY_c$ wherein X is Cr, Mn, Nb, Ta, Ti, V and/or W, and preferably Mn, Nb, V and/or W; Y is Bi, Ce, Co, Cu, Fe, K, Mg, Ni, P, Pb, Sb, Si, Sn, Tl and/or U, and preferably Sb, Ce and/or U, a is 1, b is 0.05 to 1.0 and c is 0 to 2, and preferably 0.05 to 1.0, with the proviso that the total value of c for Co, Ni and/or Fe is less than 0.5.

WO 99/20592 to Celanese relates to a method of selectively producing acetic acid from ethane, ethylene or mixtures thereof and oxygen at high temperature in the presence of a catalyst having the formula $Mo_aPd_bX_cY_d$ wherein X represents one or several of Cr, Mn, Nb, Ta, Ti, V, Te and W; Y represents one or several of B, Al, Ga, In, Pt, Zn, Cd, Bi, Ce, Co, Rh, Ir, Cu, Ag, Au, Fe, Ru, Os, K, Rb, Cs, Mg, Ca, Sr, Ba, Nb, Zr, Hf, Ni, P, Pb, Sb, Si, Sn, Tl and U and a=1, b=0.0001 to 0.01, c=0.4 to 1 and d=0.005 to 1.

German patent application DE 196 30 832 A1 relates to a similar catalyst composition in which a=1, b>0, c>0 and d=0 to 2. Preferably, a=1, b=0.0001 to 0.5, c=0.1 to 1.0 and d=0 to 1.0.

The catalysts of both WO 99/20592 and DE 19630832 require the presence of palladium.

WO 98/47850 relates to a process for producing acetic acid from ethane, ethylene or mixtures thereof and a catalyst having the formula $W_aX_bY_cZ_d$ in which X represents one or several of Pd, Pt, Ag and Au, Y represents one or several of V, Nb, Cr, Mn, Fe, Sn, Sb, Cu, Zn, U, Ni, and Bi and Z represents one or several of Li, Na, K, Rb, Cs, Be, Mg, Ca, Sr, Ba, Sc, Y, La, Ti, Zr, Hf, Ru, Os, Co, Rh, Ir, B, Al, Ga, In, Tl, Si, Ge, Pb, P, As and Te, a=1, b>0, c>0 and d is 0 to 2.

The catalyst of WO 98/47850 does not contain molybdenum.

WO 99/51339 relates to a catalyst composition for the selective oxidation of ethane and/or ethylene to acetic acid which composition comprises in combination with oxygen the elements $Mo_aW_bAg_cIr_dX_eY_f$ wherein X is the elements Nb and V; Y is one or more elements selected from the group consisting of Cr, Mn, Ta, Ti, B, Al, Ga, In, Pt, Zn, Cd, Bi, Ce, Co, Rh, Cu, Au, Fe, Ru, Os, K, Rb, Cs, Mg, Ca, Sr, Ba, Zr, Hf, Ni, P, Pb, Sb, Si, Sn, Tl, U, Re and Pd; a, b, c, d, e and f represent the gram atom ratios of the elements such that $0<a\leq1$, $0\leq b<1$ and $a+b=1$; $0<(c+d)\leq0.1$; $0<e\leq2$; and $0\leq f\leq2$.

There remains a need for catalyst for the oxidation of ethane to ethylene and/or acetic acid and/or for the oxidation of ethylene to acetic acid and a process for the production of acetic acid and/or ethylene employing the catalyst.

We have found that oxidation catalysts comprising molybdenum, vanadium and niobium in combination with oxygen which employ gold as an essential component in the absence of palladium can fulfill the need for an oxidation catalyst and process employing same.

Accordingly, the present invention provides a catalyst composition for the oxidation of ethane to ethylene and/or acetic acid and/or for the oxidation of ethylene to acetic acid which composition comprises in combination with oxygen the elements molybdenum, vanadium, niobium and gold in the absence of palladium according to the empirical formula:

$$Mo_aW_bAu_cV_dNb_eY_f \qquad (I)$$

wherein Y is one or more elements selected from the group consisting of: Cr, Mn, Ta, Ti, B, Al, Ga, In, Pt, Zn, Cd, Bi, Ce, Co, Rh, Ir, Cu, Ag, Fe, Ru, Os, K, Rb, Cs, Mg, Ca, Sr, Ba, Zr, Hf, Ni, P, Pb, Sb, Si, Sn, Tl, U, Re, Te, La and Pd; a, b, c, d, e and f represent the gram atom ratios of the elements such that:

$0<a\leq1$; $0\leq b<1$ and $a+b=1$;

$10^{-5}<c\leq0.02$;

$0<d\leq2$;

$0<e\leq1$; and $0<f\leq2$.

Catalysts embraced within the formula (I) include:

$Mo_aW_bAu_cV_dNb_eY_f$ $Mo_aAu_cV_dNb_eY_f$ $Mo_aW_bAu_cV_dNb_e$ $Mo_aAu_cV_dNb_e$

Examples of suitable catalysts having the formula (I) include: $Mo_{1.00}V_{0.25}Nb_{0.12}Au_{0.01}O_y$; $Mo_{1.00}V_{0.213}Nb_{0.138}Au_{0.007}O_y$; $Mo_{1.00}V_{0.232}Nb_{0.139}Au_{0.007}O_y$; and $Mo_{1.000}V_{0.426}Nb_{0.115}Au_{0.0008}O_y$ wherein y is a number which satisfies the valencies of the elements in the composition for oxygen.

Preferably $a>0.01$. Preferably, $d>0.1$. Preferably, $e>0.01$. Preferably, $e\leq0.5$. Preferably, $f\geq0.01$. Preferably, $f\leq0.5$.

Preferably, Y is selected from the group consisting of Bi, Ca, Ce, Cu, K, P, Sb, La and Te.

An advantage of catalyst compositions according to the present invention is that they can be more active and selective in converting ethane and/or ethylene to acetic acid and/or ethylene.

The catalyst compositions may be prepared by any of the methods conventionally employed for the preparation of catalysts. Suitably the catalyst may be prepared from a solution of soluble compounds and/or complexes and/or compounds of each of the metals. The solution is preferably an aqueous system having a pH in the range from 1 to 12, preferably from 2 to 8, at a temperature of from 20° to 100° C.

Generally, a mixture of compounds containing the elements is prepared by dissolving sufficient quantities of soluble compounds and dispersing any insoluble compounds so as to provide a desired gram-atom ratio of the elements in the catalyst composition. The catalyst composition may then be prepared by removing the solvent from the mixture. The catalyst may be calcined by heating to a temperature of from 200 to 550° C., suitably in air or oxygen, for a period of from 1 minute to 24 hours. Preferably, the air or oxygen is slowly flowing.

The catalyst may be used unsupported or supported. Suitable supports include silica, alumina, zirconia, titania, silicon carbide and mixtures of two or more thereof.

Further details of a suitable method for preparing a catalyst composition may be found in, for example, EP-A-0166438.

The catalyst may be used in the form of a fixed or a fluidised bed.

In another embodiment the present invention provides a process for the production of ethylene and/or acetic acid from a gaseous mixture comprising ethane and/or ethylene which process comprises contacting the gaseous mixture with a molecular oxygen-containing gas at elevated temperature in the presence of a catalyst composition as hereinbefore described.

Ethane is oxidised to ethylene and/or acetic acid and/or ethylene is oxidised to acetic acid. Preferably, ethane and optional ethylene is oxidised to a mixture comprising ethylene and acetic acid which may be used with or without the addition or removal of acetic acid and/or ethylene for the production of vinyl acetate by reaction with a molecular oxygen-containing gas in an integrated process.

The feed gas comprises ethane and/or ethylene, preferably ethane.

Ethane and/or ethylene may be used in substantially pure form or admixed with one or more of nitrogen, methane, carbon dioxide and water in the form of steam, which may be present in major amounts, for example greater than 5 volume percent or one or more of hydrogen, carbon monoxide, $C_3/C_4$ alkenes and alkenes, which may be present in minor amounts, for example less than 5 volume percent.

The molecular oxygen-containing gas may be air or a gas richer or poorer in molecular oxygen than air, for example oxygen. A suitable gas may be, for example, oxygen diluted with a suitable diluent, for example nitrogen.

It is preferred to feed, in addition to ethane and/or ethylene and the molecular oxygen-containing gas, water (steam) because this can improve the selectivity to acetic acid.

The elevated temperature may suitably be in the range from 200 to 500° C., preferably from 200 to 400° C.

The pressure may suitably be atmospheric or superatmospheric, for example in the range from 1 to 50 bar, preferably from 1 to 30 bar.

The catalyst composition is preferably calcined before use in the process of the invention. Calcination may suitably be achieved by heating at a temperature suitably in the range from 250 to 500° C. in the presence of an oxygen-containing gas, for example air.

Operating conditions and other information applicable to the performance of the invention may be found in the aforesaid prior art, for example U.S. Pat. No. 4,250,346.

The process of the invention will now be further illustrated by reference to the following Examples.

Catalyst Preparation

Examples According to the Present Invention

EXAMPLE 1

$Mo_{1.00}V_{0.213}Nb_{0.138}Au_{0.007}O_y$

A solution was prepared by dissolving 12.71 g ammonium molybdate, 2.11 g ammonium vanadate, 2.43 g niobium chloride, 0.36 g ammonium Au tetrachloride and 2.03 g oxalic acid in 200 ml water heated to 70° C. for 15 minutes, followed by evaporation to dryness over 2 hours. The resulting catalyst cake was ground then calcined in static air in an oven at 350° C. for 5 hours. The composition of the catalyst as analysed by XRF and found also to contain traces of platinum, silver, iridium, rhodium and ruthenium, represented as an empirical formula:

$Mo_{1.00}V_{0.213}Nb_{0.138}Au_{0.007}Pt_{0.000035}Ag_{0.000005}$
$Ir_{0.000001}Rh_{0.000002}Ru_{0.000004}O_y.$

EXAMPLE 2

$Mo_{0.00}V_{0.232}Nb_{0.139}Au_{0.007}O_y$

A solution was prepared by dissolving 12.71 g ammonium molybdate, 2.11 g ammonium vanadate, 2.43 g niobium chloride, 0.36 g ammonium Au tetrachloride and 2.03 g oxalic acid in 200 ml water heated to 70° C. for 15 minutes, followed by evaporation to dryness over 2 hours. The resulting catalyst cake was ground then calcined in static air in an oven at 350° C. for 5 hours. The composition of the catalyst as analysed by XRF and found also to contain traces of platinum, silver, iridium, rhodium and ruthenium, represented as an empirical formula:

$Mo_{1.00}V_{0.232}Nb_{0.139}Au_{0.007}Pt_{0.000005}Ag_{0.000007}$
$Ir_{0.0000002}Rh_{0.0000003}Ru_{0.0000004}O_y.$

Example 3

$(Mo_{1.000}V_{0.426}Nb_{0.115}Au_{0.0008}O_y)$

A solution was prepared by dissolving 12.92 g ammonium molybdate, 3.65 g ammonium vanadate, 2.27 g niobium chloride, 0.0214 g ammonium Au tetrachloride and 2.43 g oxalic acid in 200 ml water heated to 70° C. for 15 minutes, followed by evaporation to dryness over 2 hours. The resulting catalyst cake was ground then calcined in static air in an oven at 400° C. for 5 hours. The nominal composition of the catalyst was thus: $Mo_{1.000}V_{0.426}Nb_{0.115}Au_{0.0008}O_y.$ Examples Not According to the Invention Comparative Example A $Mo_{0.00}V_{0.25}Nb_{0.12}O_y$ A solution A was prepared by dissolving 12.71 g ammonium molybdate in 50 ml water heated to 70° C. A second solution B was prepared by dissolving 2.11 g ammonium vanadate in 70 ml water heated to 70° C. Another solution C was prepared by dissolving 2.43 g niobium chloride and 2.02 g oxalic acid in 50 ml water heated to 70° C. Next, solution C was added to solution B and the resulting mixture heated at 70° C. for 15 minutes. Solution A was then added and the final mixture heated at 70° C. for 15 minutes, before evaporating the mixture to dryness over not more than 2 hours. The resulting catalyst cake was ground then calcined in static air in an oven at 350° C. for 5 hours. The nominal composition of the catalyst was thus $Mo_{1.00}V_{0.25}Nb_{0.12}O_y.$ Comparative Example B $Mo_{1.00}V_{0.25}O_y$ As for comparative example A except that no solution C was prepared. The nominal composition of the catalyst was thus $Mo_{1.00}V_{0.25}O_y.$ Comparative Example C $Mo_{1.00}V_{0.25}Nb_{0.12}Pd_{0.01}O_y$ As for comparative example A except that 0.23 g Pd acetate was added to solution A. The nominal composition of the catalyst was thus $Mo_{1.00}V_{0.25}Nb_{0.12}Pd_{0.01}O_y.$ Comparative Example D $Mo_{1.00}V_{0.25}Nb_{0.12}Ru_{0.01}O_y$ As for comparative example A except that 0.36 g of ammonium Ru hexachloride was added to solution A. The nominal composition of the catalyst was thus $Mo_{1.00}V_{0.25}Nb_{0.12}Ru_{0.01}O_y$.

Comparative Example E

$Mo_{1.00}V_{0.25}Nb_{0.12}Rh_{0.01}O_y$

As for comparative example A except that 0.15 g of Rh (III) hydroxide was added to solution A. The nominal composition of the catalyst was thus $Mo_{1.00}V_{0.25}Nb_{0.12}Rh_{0.01}O_y$.

Catalyst Test Procedure

Typically, 5 mls of catalyst was loaded into a fixed bed reactor made of Hasetelloy grade C276 of dimensions 12 mm internal diameter and length 40 cm. Glass beads were used to maintain the catalyst in position in the centre of the reactor. Above the catalyst, the glass beads thus acted as a mixing and pre-heating zone for gaseous and liquid reagents. The test apparatus was then pressure-tested at 21 bar with helium to check for leaks. Catalysts were then activated by heating to reaction pressure at 50° C./min in helium for 16 hours, to ensure full decomposition of catalyst precursors.

For Examples 1 and 2 and the Comparative Experiments, the required flows of ethane, 20% oxygen in helium and water were then introduced to the reactor, to ensure an inlet composition of 42% v/v ethane, 6.6% oxygen, 25% v/v helium and 26.4% v/v water (as steam). The total feed flow rate was maintained at a level to ensure a feed GHSV of about 3000/h. In the case of Example 3, performance was measured with less water in the feed than Examples 1 and 2, and ethylene was added to the feed mixture, such that an inlet feed composition of 52% v/v ethane, 5% v/v ethylene, 6.6% oxygen, 10% v/v water and balance helium was used.

After equilibrating for 30 minutes, gas samples were taken from the outlet stream to calibrate a GC (model Unicam 4400) for ethane, oxygen and helium. Next, the setpoint temperature of the reactor was increased until 75%–100% oxygen conversion was achieved, as indicated by the presence in the outlet stream of less than 2.2% v/v oxygen.

Following an equilibration period of 30 minutes, catalysts were then evaluated under steady state conditions for a period of typically 4–5 hours. Exit gas volume was measured over the run period by a water-gas meter. Liquid products were collected and weighed after the run period. Composition of gas and liquid products was measured using GC analysis (Unicam 4400 and 4200 fitted with TCD and FID detectors respectively).

All feed and product flow rates and compositions were entered into a spreadsheet, and the following parameters calculated according to the formulae in which AcOH represents acetic acid:

STY(space time yield)%=(g AcOH)/litre catalyst bed/hour

Conversions
  of ethane=(inlet mol ethane−outlet mol ethane)/inlet mol ethane*100
  of oxygen=(inlet mol oxygen−outlet mol oxygen)/inlet mol oxygen*100

Selectivities
  to AcOH(C-mol %)=(outlet mol AcOH*2)/(mol ethane converted*2)*100
  to ethylene(C-mol %)=(outlet mol ethylene*2)/(mol ethane converted*2)*100
  to CO(C-mol %)=(outlet mol CO)/(mol ethane converted*2)*100
  to $CO_2$(C-mol %)=(outlet mol $CO_2$)/(mol ethane converted*2)*100
  to $CO_x$=selectivity to CO(C-mol %)+selectivity to $CO_2$ (C-mol %)

Typically, mass balance and carbon balance for a reaction was found to be 100+/−5%.

Results

The following tables 1 and 2 compare the catalyst performance of the above. Each catalyst was evaluated under standard conditions indicated in the tables, except for the temperature, which was varied so as to achieve 70–90% oxygen conversion, in order to facilitate comparison.

TABLE 1

| Experiment | Temp. of bed °C. | Ethane convn % | Oxygen convn % | Sel. $C_2H_4$ % C-mol | Sel $CO_x$ % C-mol | Sel. AcOH % C-mol | STY AcOH g/l-cat/h |
|---|---|---|---|---|---|---|---|
| A | 326 | 3.2 | 82.4 | 41.9 | 16.2 | 41.3 | 82 |
| B | 314 | 4.8 | 79.4 | 15.1 | 67.0 | 17.8 | 20 |
| C | 253 | 3.9 | 76.8 | 0.0 | 36.9 | 62.9 | 82 |
| D | 293 | 5.0 | 71.8 | 43.7 | 16.5 | 39.8 | 70 |
| E | 304 | 5.7 | 87.5 | 43.1 | 15.5 | 40.3 | 89 |
| Example 1 | 275 | 7.4 | 88.7 | 38.1 | 9.1 | 48.6 | 136 |
| Example 1 | 285 | 9.2 | 100.0 | 37.8 | 8.5 | 51.5 | 177 |
| Example 1 | 295 | 10.0 | 100.0 | 34.6 | 8.8 | 54.9 | 203 |
| Example 2 | 303 | 7.1 | 73.3 | 38.1 | 6.3 | 54.6 | 142 |
| Example 2 | 313 | 7.8 | 80.0 | 38.4 | 6.1 | 54.8 | 158 |
| Example 2 | 323 | 8.8 | 92.7 | 40.8 | 7.2 | 51.1 | 165 |

Conditions:
42% v/v ethane, 6.6% v/v oxygen, 25% v/v water, Balance He,
GHSV = 2970; 21 bar.

TABLE 2

| Experiment | Temp. of bed °C. | Ethane convn % | Oxygen convn % | Sel. $C_2H_4$ % C-mol | Sel $CO_x$ % C-mol | Sel. % C-mol | STY AcOH g/l-cat/h |
|---|---|---|---|---|---|---|---|
| Example 3 | 300 | 11.3 | 71.7 | 55.8 | 4.8 | 39.3 | 198 |

Feed: 52% v/v ethane, 5% v/v ethylene, 6.6% v/v oxygen, 10% v/v water, Balance He.
Conditions: 9 bar,
GHSV = 3200/h The results in the Tables illustrate clearly the promotional effect of gold on Mo—V—Nb based oxide catalysts. The results in the Tables also show that the performance of gold promoted catalysts according to the present invention is affected by the molar ratios of molybdenum, vanadium and niobium and by the gold content as well as being influenced by the reaction conditions.

We claim:

1. A catalyst composition comprising in combination with oxygen the elements molybdenum, vanadium, niobium and gold in the absence of palladium according to the empirical formula: $mO_aW_bAu_cV_dNb_eY_f$ (I) wherein Y is one or more elements selected from the group consisting of: Cr, Mn, Ta, Ti, B, Al, Ga, In, Pt, Zn, Cd, Bi, Ce, Co, Rh, Ir, Cu, Ag, Fe, Ru, Os, K, Rb, Cs, Mg, Ca, Sr, Ba, Zr, Hf, Ni, P, Pb, Sb, Si, Sn, Tl, U, Re, Te and La;

a, b, c, d, e and f represent the gram atom ratios of the elements such that:

$0 < a \leq 1$; $0 \leq b < 1$ and $a+b=1$;

$10^{-5} < c \leq 0.02$;

$0 < d \leq 2$;

$0 \leq e \leq 1$; and $0 < f \leq 2$.

2. A catalyst composition as claimed in claim 1 wherein formula I is selected from the group consisting of $Mo_aW_bAu_cV_dNb_eY_f$; $Mo_aAu_cV_dNb_eY_f$; $Mo_aW_bAu_cV_dNb_e$ and $MO_aAu_cV_dNb_e$.

3. A catalyst composition as claimed in claim 1 wherein $0.01 < a \leq 1$, $0.1 < d \leq 2$, $0.01 < e \leq 0.5$ and $0.01 \leq f \leq 0.5$.

4. A catalyst composition as claimed in claim 2 wherein $0.01 < a \leq 1$, $0.1 < d \leq 2$, $0.01 < e \leq 0.5$ and $0.01 \leq f \leq 0.5$.

5. A catalyst composition as claimed in claim 1 wherein Y is selected from the group consisting of Bi, Ca, Ce, Cu, K, P, Sb, La and Te.

6. A catalyst composition as claimed in claim 2 wherein Y is selected from the group consisting of Bi, Ca, Ce, Cu, K, P, Sb, La and Te.

7. A catalyst composition as claimed in claim 3 wherein Y is selected from the group consisting of Bi, Ca, Ce, Cu, K, P, Sb, La and Te.

8. A catalyst composition as claimed in claim 1 having the formula selected from the group consisting of $Mo_{1.00}V_{0.25}Nb_{0.12}Au_{0.01}O_y$; $Mo_{1.00}V_{0.213}Nb_{0.138}Au_{0.007}O_y$; $Mo_{1.00}V_{0.232}Nb_{0.139}Au_{0.007}O_y$; and $Mo_{1.000}V_{0.426}Nb_{0.115}Au_{0.0008}O_y$ wherein y is a number which satisfies the valencies of the elements in the composition for oxygen.

9. A process for the oxidation of ethane to ethylene and/or acetic acid and/or for the oxidation of ethylene to acetic acid which process comprises contacting a gaseous mixture comprising ethane and/or ethylene with a molecular oxygen-containing gas at elevated temperature in the presence of a catalyst composition as claimed in any preceding claim.

10. A process as claimed in claim 9 in which ethane and optionally ethylene is oxidised to a mixture comprising ethylene and acetic acid.

11. A process as claimed in claim 10 in which the mixture comprising ethylene and acetic acid, with or without the addition or removal of acetic acid and/or ethylene, is further reacted with a molecular oxygen-containing gas to produce vinyl acetate.

12. A process as claimed claim 9 in which the catalyst is used in the form of a fluidised bed.

13. A process as claimed claim 11 in which the catalyst is used in the form of a fluidised bed.

* * * * *

UNITED STATES PATENT AND TRADEMARK OFFICE
CERTIFICATE OF CORRECTION

PATENT NO. : 6,333,444 B1
DATED : December 25, 2001
INVENTOR(S) : Ellis et al.

It is certified that error appears in the above-identified patent and that said Letters Patent is hereby corrected as shown below:

Column 2,
Line 22, please change "$0<f\leqq2.$" to -- $0 \leq f \leq 2.$ --.

Column 7,
Lines 35-36, please change "$0\leqq e\leqq 1;$ and $0<f\leqq 2.$" to -- $0 < e \leq 1;$ and $0 \leq f \leq 2.$ --.

Signed and Sealed this

Thirtieth Day of September, 2003

JAMES E. ROGAN
*Director of the United States Patent and Trademark Office*